United States Patent
Chen et al.

(10) Patent No.: US 11,665,256 B2
(45) Date of Patent: May 30, 2023

(54) METHOD AND APPARATUS FOR PROCESSING DATA OF A TARGET DRIVING DEVICE, ELECTRONIC DEVICE AND MEDIUM

(71) Applicant: Apollo Intelligent Connectivity (Beijing) Technology Co., Ltd., Beijing (CN)

(72) Inventors: Weiliang Chen, Beijing (CN); Long Zhang, Beijing (CN); Yumei Zhang, Beijing (CN)

(73) Assignee: Apollo Intelligent Connectivity (Beijing) Technology Co., Ltd., Beijing (CN)

( * ) Notice: Subject to any disclaimer, the term of this patent is extended or adjusted under 35 U.S.C. 154(b) by 0 days.

(21) Appl. No.: 17/674,746

(22) Filed: Feb. 17, 2022

(65) Prior Publication Data
US 2022/0174128 A1    Jun. 2, 2022

(30) Foreign Application Priority Data
Apr. 20, 2021 (CN) .......................... 202110426632.4

(51) Int. Cl.
*H04L 67/55* (2022.01)
*B60W 50/02* (2012.01)
*B60W 50/14* (2020.01)
*H04W 4/12* (2009.01)

(52) U.S. Cl.
CPC ............. *H04L 67/55* (2022.05); *B60W 50/02* (2013.01); *B60W 50/14* (2013.01); *H04W 4/12* (2013.01); *B60W 2050/146* (2013.01)

(58) Field of Classification Search
CPC ......... H04L 67/55; H04W 4/12; B60W 50/02; B60W 50/14
See application file for complete search history.

(56) References Cited

U.S. PATENT DOCUMENTS

| | | | |
|---|---|---|---|
| 2004/0224694 A1 | 11/2004 | Zhao et al. | |
| 2013/0070932 A1* | 3/2013 | Nyu ....................... | H04R 3/007 381/58 |
| 2013/0190032 A1* | 7/2013 | Li ........................... | H04L 67/56 455/517 |
| 2015/0350885 A1* | 12/2015 | Stanley-Marbell ..... | G06F 9/542 455/418 |
| 2015/0367861 A1* | 12/2015 | Mori ..................... | G08G 1/166 701/1 |
| 2018/0361928 A1* | 12/2018 | Koo ........................ | B60Q 9/00 |
| 2019/0363886 A1* | 11/2019 | Atwood .............. | H04L 63/0807 |
| 2021/0395976 A1* | 12/2021 | Nomura .................. | E02F 9/207 |
| 2022/0185178 A1* | 6/2022 | Sudo ....................... | B60Q 5/008 |

OTHER PUBLICATIONS

Extended European Search Report issued from the European Patent Office to EP Application No. 22156900.7 dated Mar. 18, 2022, 10 pages.

* cited by examiner

*Primary Examiner* — Jeong S Park
(74) *Attorney, Agent, or Firm* — Hunton Andrews Kurth LLP

(57) ABSTRACT

A data processing method includes: in the case where an operation state of an audio/video device in a target driving device is an out of operation state, generating an out of operation state notification message of the audio/video device; and sending the out of operation state notification message to a push client for stopping a data push between the push client and a push server using the out of operation state notification message.

9 Claims, 3 Drawing Sheets

METHOD AND APPARATUS FOR PROCESSING DATA OF A TARGET DRIVING DEVICE, ELECTRONIC DEVICE AND MEDIUM

CROSS REFERENCE TO RELATED APPLICATION(S)

This application claims the priority to Chinese Patent Application No. CN 202110426632.4, and filed on Apr. 20, 2021, the disclosure of which is incorporated herein by reference in its entirety.

TECHNICAL FIELD

The present disclosure relates to the field of data processing and, in particular, to the fields of data pushes, cloud computing and cloud services, especially a data processing method and apparatus, an electronic device and a medium.

BACKGROUND

In an in-vehicle scenario, a data push of a vehicle system enables a user to acquire relevant information and important system notifications pushed by various applications of the vehicle system in a timely manner. Timeliness and integrity of the data push will affect the determination of a current state of a vehicle and acquisition of application information of the user to a great extent.

The existing vehicle system recognizes a native shutdown broadcast of the system and then stops the data push between the system and a push server.

SUMMARY

The present disclosure provides a method and apparatus, an electronic device and a medium for stopping a data push between a push client and a push server.

According to an aspect of the present disclosure, a data processing method is provided, which includes steps described below.

In the case where an operation state of an audio/video device in a target driving device is an out of operation state, an out of operation state notification message of the audio/video device is generated.

The out of operation state notification message is sent to a push client for stopping a data push between the push client and a push server using the out of operation state notification message.

According to another aspect of the present disclosure, a data processing apparatus is provided, which includes at least one processor and a memory communicatively connected to the at least one processor. The memory stores an instruction executable by the at least one processor, and the instruction is executed by the at least one processor to cause the at least one processor to perform steps in a notification message generation module and a data push stopping module.

The notification message generation module is configured to generate an out of operation state notification message of an audio/video device in the case where an operation state of the audio/video device in a target driving device is an out of operation state.

The data push stopping module is configured to send the out of operation state notification message to a push client for stopping a data push between the push client and a push server using the out of operation state notification message.

According to another aspect of the present disclosure, a non-transitory computer-readable storage medium is provided. The storage medium stores a computer instruction for causing a computer to perform any method in the present disclosure.

It is to be understood that the content described in this part is neither intended to identify key or important features of embodiments of the present disclosure nor intended to limit the scope of the present disclosure. Other features of the present disclosure are apparent from the description provided hereinafter.

BRIEF DESCRIPTION OF DRAWINGS

The drawings are intended to provide a better understanding of the present solution and not to limit the present disclosure. In the drawings.

DETAILED DESCRIPTION

Example embodiments of the present disclosure, including details of embodiments of the present disclosure, are described hereinafter in conjunction with drawings to facilitate understanding. The example embodiments are merely illustrative. Therefore, it will be appreciated by those of ordinary skill in the art that various changes and modifications may be made to the embodiments described herein without departing from the scope and spirit of the present disclosure. Similarly, description of well-known functions and constructions is omitted hereinafter for clarity and conciseness.

During the process of research and development, the applicant finds that in an existing in-vehicle scenario, a data push is implemented in the following manner: a push server pushes data to a push client in a vehicle, and the push client distributes the pushed data to message clients so that the message clients process the pushed data and display the processed data on an audio/video device. Moreover, an existing manner for stopping the data push is that the push client recognizes a native shutdown broadcast of a vehicle system and then stops the data push between the push client and the push server.

However, the existing manner for stopping the data push has the following disadvantages: before the vehicle system generates the native shutdown broadcast, the audio/video device is already in an out of operation state, and a user cannot see or hear the pushed data, but the push client is still receiving data pushed by the push server so that the user cannot perceive the pushed data during a time period from when the audio/video device in the vehicle is in the out of operation state to when the vehicle system generates the native shutdown broadcast, resulting in a loss of the pushed data.

Figure 1:
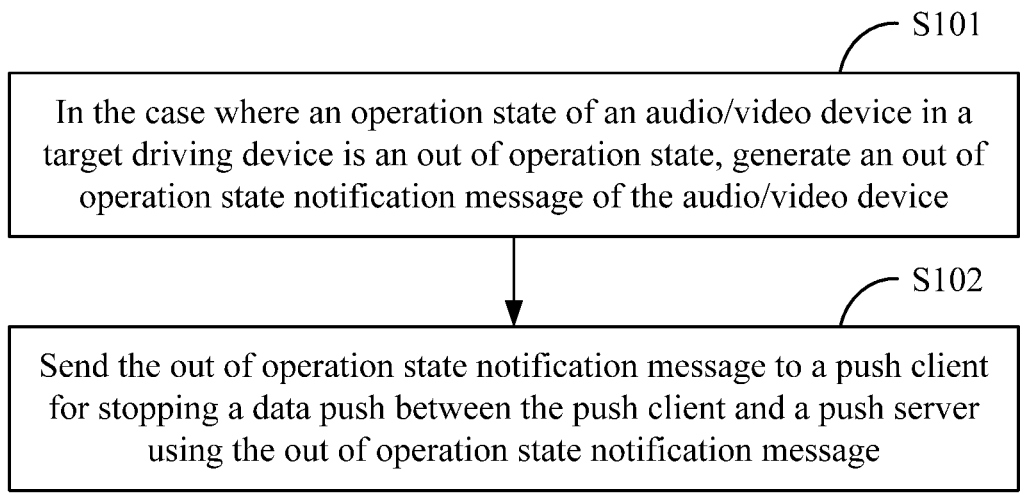
FIG. 1 is a flowchart of a data processing method according to an embodiment of the present disclosure.

FIG. 1 is a flowchart of a data processing method according to an embodiment of the present disclosure. This embodiment is applicable to the case where a data push between a push client and a push server is stopped. The method in this embodiment may be performed by a data processing apparatus according to an embodiment of the present disclosure. The apparatus may be implemented by software and/or hardware and integrated in any electronic device having a computing capability.

As shown in FIG. 1, the data processing method in this embodiment may include steps described below.

In S101, in the case where an operation state of an audio/video device in a target driving device is an out of operation state, an out of operation state notification message of the audio/video device is generated.

The target driving device includes, but is not limited to, a device having a driving function, such as an automobile, an electric vehicle and a moped. The target driving device is provided with the audio/video device which includes, but is not limited to, a display screen, a stereo, a horn, a speaker and the like. Any audio/video device enabling an occupant in the target driving device to acquire information is within the scope of this embodiment. The operation state of the audio/video device includes a normal operation state and the out of operation state.

When the operation state of the audio/video device is the normal operation state, the audio/video device can transmit information to the occupant, for example, a display displays the information visually, or the stereo plays the information in an audio manner. When the operation state of the audio/video device is the out of operation state, the audio/video device cannot transmit the information to the occupant, for example, the display is in an off state, or the stereo is in a stopped playing state.

In an embodiment, a vehicle system of the target driving device monitors the operation state of the audio/video device in real time. A monitoring manner may be directly monitoring the operation state of the audio/video device through an installed monitoring device, for example, monitoring whether the display screen is on or off, or monitoring whether a speaker function of the stereo is enabled or disabled. Further, the monitoring manner may also be acquiring an operating parameter of the target driving device and indirectly determining the operation state of the audio/video device according to the operating parameter, for example, determining the operation state of the audio/video device through a current value or a voltage value of the target driving device. In the case where the operation state of the audio/video device is determined to be the out of operation state, the vehicle system generates the out of operation state notification message of the audio/video device. The vehicle system may be developed based on any intelligent operating system (OS) such as an Android system, an iPhone OS (iOS) system or a Windows system. Notification messages are configured to transmit information between the vehicle system and clients, and different vehicle systems correspond to different specific forms of notification messages. For example, when the vehicle system is developed based on the Android system, the notification message is an Android system broadcast.

In the case where the operation state of the audio/video device in the target driving device is the out of operation state, the out of operation state notification message of the audio/video device is generated, which lays a foundation for subsequently sending the out of operation state notification message to the push client.

In S102, the out of operation state notification message is sent to the push client for stopping the data push between the push client and the push server using the out of operation state notification message.

The push client is disposed in the vehicle system and configured to set up a communication connection with the push server to receive pushed data sent by the push server and forward the received pushed data to a message client so that the message client processes the pushed data and displays the pushed data on the audio/video device. The pushed data includes, but is not limited to, notification information, promotion information, software update information or application software state information of various kinds of application software.

In an embodiment, the vehicle system may send the out of operation state notification message to the push client in the following manner: the vehicle system directly sends the out of operation state notification message to the push client, or the vehicle system sends the out of operation state notification message to the message client and then controls the message client to forward the out of operation state notification message to the push client. Any sending manner enabling the push client to receive the out of operation state notification message is within the scope of this embodiment. After receiving the out of operation state notification message, the push client generates a communication interruption instruction according to the out of operation state notification message and sends the communication interruption instruction to the push server. After receiving the communication interruption instruction and verifying the validity of the communication interruption instruction, the push server interrupts data communication with the push client, that is, stops the data push between the push server and the push client. Thereafter, the push server caches data to be pushed locally on the push server until the vehicle system restarts and sets up the data communication with the push client again and then sends the cached data to be pushed to the push client.

The out of operation state notification message is sent to the push client for stopping the data push between the push client and the push server using the out of operation state notification message, which achieves an effect of stopping the data push between the push client and the push server according to the out of operation state notification message.

In the present disclosure, in the case where the operation state of the audio/video device in the target driving device is the out of operation state, the out of operation state notification message of the audio/video device is generated, and the out of operation state notification message is sent to the push client for stopping the data push between the push client and the push server using the out of operation state notification message, thereby ensuring that the data push between the push client and the push server is stopped immediately and avoiding the problem of a loss of pushed data in the case where the push server still pushes data to the push client when the audio/video device is out of operation and a user cannot perceive the pushed data.

On the basis of the preceding embodiment, after S102 in which "the data push between the push client and the push server is stopped", the method further includes steps described below.

In the case where the operation state of the audio/video device in the target driving device is the normal operation state, a normal state notification message of the audio/video device is generated; and the normal state notification message is sent to the push client for starting the data push between the push client and the push server using the normal state notification message.

In an embodiment, when the operation state of the audio/video device changes to the normal operation state again, the vehicle system generates the normal state notification message and sends the normal state notification message to the push client. The push client generates a communication setup request according to the normal state notification message and sends the communication setup request to the push server. After receiving the communication setup request and verifying the validity of the communication setup request, the push server sets up the data communication with the push client, that is, starts the data push between the push server and the push client. The push client sends a heartbeat packet to the push server periodically, and after obtaining a response from the push server, the push client confirms a state of the communication connection with the push server. The message client acquires the pushed data from the push server and sent by the push server by being bound to a push service, processes the pushed data, and displays the pushed data on the audio/video device.

In the case where the operation state of the audio/video device in the target driving device is the normal operation state, the normal state notification message of the audio/video device is generated, and the normal state notification message is sent to the push client for starting the data push between the push client and the push server using the normal state notification message, which starts the data push between the push client and the push server when the audio/video device operates normally so that the user can perceive the pushed data immediately, ensuring the timeliness of the data push.

Figure 2:
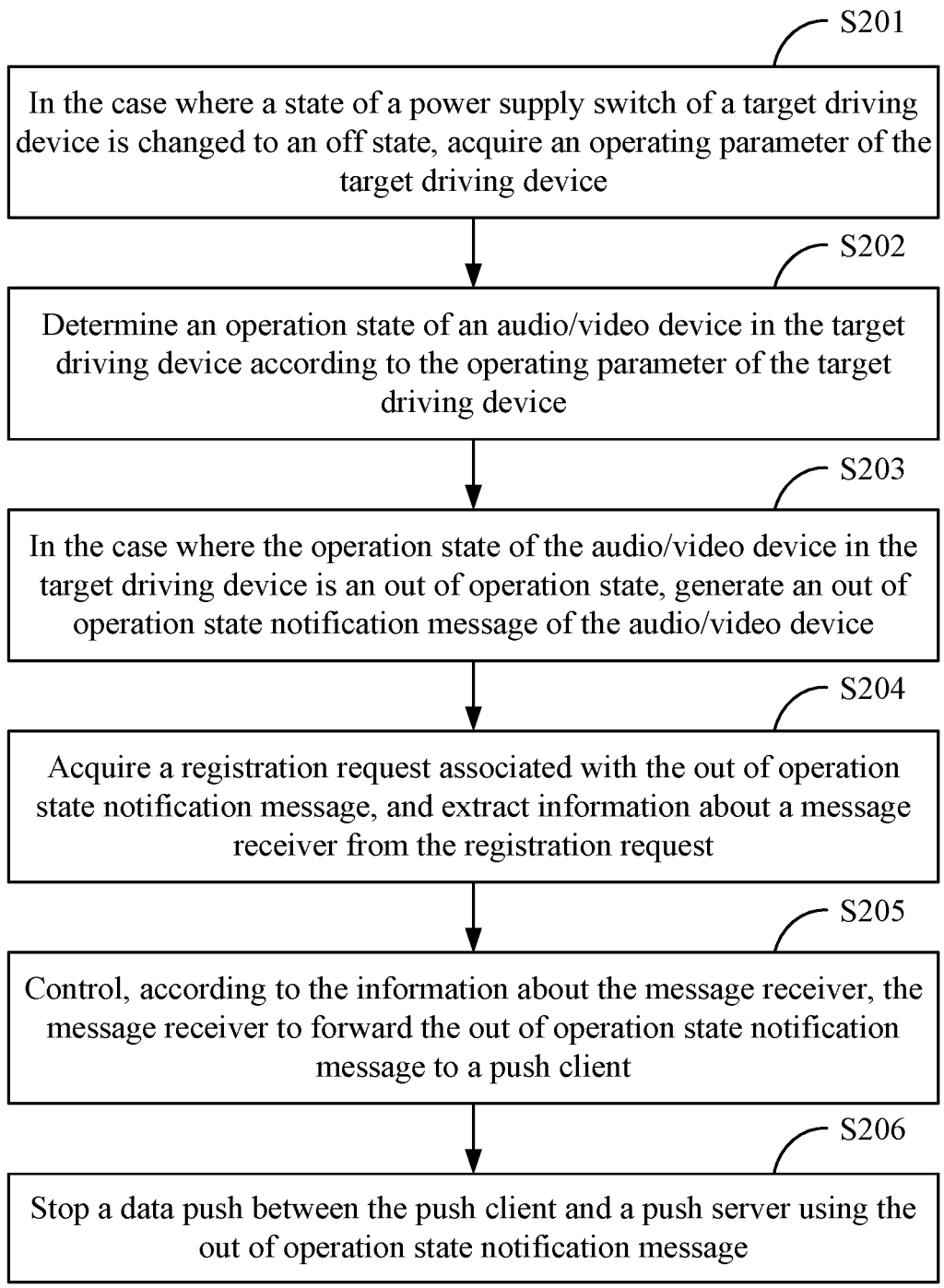
FIG. 2 is a flowchart of a data processing method according to an embodiment of the present disclosure.

FIG. 2 is a flowchart of a data processing method according to an embodiment of the present application. This embodiment is an optimization and expansion of the preceding technical solution and can be combined with each preceding optional implementation.

In S201, in the case where a state of a power supply switch of a target driving device is changed to an off state, an operating parameter of the target driving device is acquired.

The power supply switch in this embodiment includes, but is not limited to, an accessory (ACC) switch. A user controls the target driving device to supply power to an audio/video device through the power supply switch. The state of the power supply switch includes an on state and the off state. When the power supply switch is in the on state, the target driving device supplies power to the audio/video device. When the power supply switch is in the off state, the target driving device stops supplying power to the audio/video device after relevant system detection. The operating parameter of the target driving device represents a parameter variable related to an operation state of the target driving device. The operating parameter in this embodiment includes, but is not limited to, a duration of the off state of the power supply switch, a current value, a voltage value, an open/closed state of a door and the like.

In an embodiment, after a vehicle system detects that the state of the power supply switch changes from the on state to the off state, the operating parameter of the target driving device is read through a Controller Area Network bus of the target driving device.

In S202, an operation state of the audio/video device in the target driving device is determined according to the operating parameter of the target driving device.

In an embodiment, the operation state of the audio/video device in the target driving device is determined according to a value and/or a state value of the operating parameter of the target driving device.

Optionally, S202 includes a step described below.

In the case where the operating parameter of the target driving device satisfies an out of operation condition of the audio/video device, it is determined that the operation state of the audio/video device in the target driving device is an out of operation state.

The out of operation condition of the audio/video device is preset by those skilled in the art according to a condition required for the audio/video device to stop operating. The vehicle system directly matches the operating parameter of the target driving device with the out of operation condition and determines the operation state of the audio/video device in the target driving device according to a matching result.

In an embodiment, the operating parameter of the target driving device is matched with the out of operation condition. If any one operating parameter is matched with the out of operation condition successfully, it is determined that the operation state of the audio/video device in the target driving device is the out of operation state. Correspondingly, if all operating parameters fail to be matched with out of operation conditions, it is determined that the operation state of the audio/video device in the target driving device is a normal operation state.

In the case where the operating parameter of the target driving device satisfies the out of operation condition of the audio/video device, it is determined that the operation state of the audio/video device in the target driving device is the out of operation state, thereby determining the operation state of the audio/video device according to the operating parameter of the target driving device and laying a foundation for subsequently generating an out of operation state notification message.

Optionally, the out of operation condition of the audio/video device includes at least one of A, B, C or D described below.

A. The duration of the off state of the power supply switch of the target driving device exceeds a time threshold.

In an embodiment, the duration of the off state of the power supply switch among the operating parameters of the target driving device is compared with a preset time threshold. If the duration of the off state of the power supply switch exceeds the time threshold, it is determined that the operation state of the audio/video device in the target driving device is the out of operation state. Optionally, the time threshold includes 3 minutes.

B. The current value of the target driving device is less than a current threshold.

In an embodiment, the current value among the operating parameters of the target driving device is compared with a preset current threshold. If the current value is less than the current threshold, it is determined that the operation state of the audio/video device in the target driving device is the out of operation state. Optionally, the current threshold includes 0, that is, the target driving device is in a power-off state.

C. The voltage value of the target driving device is less than a voltage threshold.

In an embodiment, the voltage value among the operating parameters of the target driving device is compared with a preset voltage threshold. If the voltage value is less than the voltage threshold, it is determined that the operation state of the audio/video device in the target driving device is the out of operation state. Optionally, the voltage threshold includes 10.3 V.

D. The open/closed state of the door of the target driving device is an open state.

In an embodiment, the open/closed state of the door of the target driving device is detected. If the door of the target driving device changes from a closed state to the open state, it is determined that the operation state of the audio/video device in the target driving device is the out of operation state.

The out of operation condition of the audio/video device is configured to include at least one of the following: the duration of the off state of the power supply switch of the target driving device exceeds the time threshold; the current value of the target driving device is less than the current threshold; the voltage value of the target driving device is less than the voltage threshold; or the open/closed state of the door of the target driving device is the open state, which can determine the out of operation state of the audio/video device in multiple dimensions and improve the accuracy of determining the out of operation state of the audio/video device.

In S203, in the case where the operation state of the audio/video device in the target driving device is the out of operation state, the out of operation state notification message of the audio/video device is generated.

In S204, a registration request associated with the out of operation state notification message is acquired, and information about a message receiver is extracted from the registration request.

The message receiver sends the registration request associated with the out of operation state notification message to the vehicle system so that when the vehicle system determines that the operation state of the audio/video device is the out of operation state, the vehicle system generates and sends the out of operation state notification message to the message receiver. Different types of vehicle systems correspond to different notification registration manners.

In an embodiment, the vehicle system developed based on an Android system is used as an example. Each time the vehicle system is started, a message client in the vehicle system generates a broadcast registration request for an event that "the audio/video device is out of operation" and sends the broadcast registration request to the vehicle system. A broadcast registration manner includes, but is not limited to, a static registration or a dynamic registration. The vehicle system acquires the broadcast registration request sent by the message client, acquires information about the message client (such as an identifier of the message client) from the broadcast registration request, and uses the message client as a broadcast receiver of a broadcast corresponding to the event that "the audio/video device is out of operation".

In S205, the message receiver is controlled, according to the information about the message receiver, to forward the out of operation state notification message to a push client.

In an embodiment, the vehicle system developed based on the Android system is continued to be used as an example. When the vehicle system determines that the operation state of the audio/video device is the out of operation state, the vehicle system generates an out of operation state broadcast of the audio/video device, sends the out of operation state broadcast to the message client according to the identifier of the message client, and controls the message client to forward the received out of operation state broadcast to the push client. A forwarding manner includes, but is not limited to, forwarding by a broadcast receiver disposed between the message client and the push client.

In S206, a data push between the push client and a push server is stopped using the out of operation state notification message.

In the present disclosure, in the case where the state of the power supply switch of the target driving device is changed to the off state, the operating parameter of the target driving device is acquired, and the operation state of the audio/video device is determined according to the operating parameter of the target driving device, thereby indirectly determining the operation state of the audio/video device in the target driving device according to the operating parameter of the target driving device and laying the foundation for subsequently generating the out of operation state notification message of the audio/video device. The registration request associated with the out of operation state notification message is acquired, the information about the message receiver is extracted from the registration request, and the message receiver is controlled, according to the information about the message receiver, to forward the out of operation state notification message to the push client, which provides a method for enabling the push client to acquire the out of operation state notification message and lays the foundation for subsequently stopping the data push between the push client and the push server using the out of operation state notification message.

Figure 3:
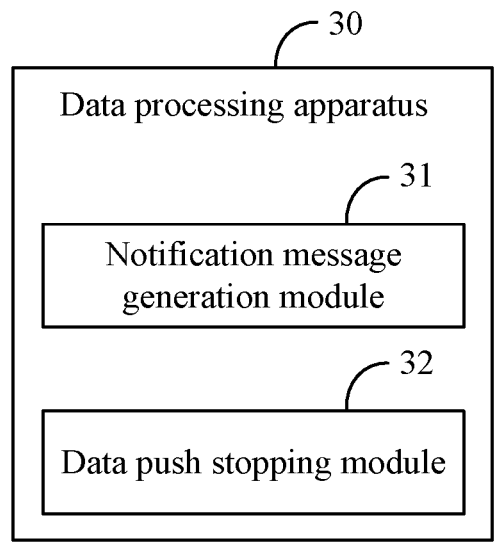
FIG. 3 is a structure diagram of a data processing apparatus according to an embodiment of the present disclosure.

FIG. 3 is a structure diagram of a data processing apparatus according to an embodiment of the present disclosure. This embodiment is applicable to the case where a data push between a push client and a push server is stopped. The apparatus in this embodiment may be implemented by software and/or hardware and integrated in any electronic device having a computing capability.

As shown in FIG. 3, a data processing apparatus 30 in this embodiment may include a notification message generation module 31 and a data push stopping module 32.

The notification message generation module 31 is configured to generate an out of operation state notification message of an audio/video device in the case where an operation state of the audio/video device in a target driving device is an out of operation state.

The data push stopping module 32 is configured to send the out of operation state notification message to a push client for stopping the data push between the push client and the push server using the out of operation state notification message.

Optionally, the apparatus includes an operation state determination module configured to perform operations described below.

In the case where a state of a power supply switch of the target driving device is changed to an off state, an operating parameter of the target driving device is acquired.

The operation state of the audio/video device in the target driving device is determined according to the operating parameter of the target driving device.

Optionally, the operation state determination module is further configured to perform an operation described below.

In the case where the operating parameter of the target driving device satisfies an out of operation condition of the audio/video device, it is determined that the operation state of the audio/video device in the target driving device is the out of operation state.

Optionally, the out of operation condition of the audio/video device includes at least one of conditions described below.

A duration of the off state of the power supply switch of the target driving device exceeds a time threshold.

A current value of the target driving device is less than a current threshold.

A voltage value of the target driving device is less than a voltage threshold.

An open/closed state of a door of the target driving device is an open state.

Optionally, the data push stopping module 32 is configured to perform operations described below.

A registration request associated with the out of operation state notification message is acquired.

Information about a message receiver is extracted from the registration request.

The message receiver is controlled, according to the information about the message receiver, to forward the out of operation state notification message to the push client.

The data processing apparatus 30 according to an embodiment of the present disclosure can perform the data processing method according to an embodiment of the present disclosure and has function modules and beneficial effects corresponding to the method. For content not described in detail in this embodiment, see description in any method embodiment of the present disclosure.

According to embodiments of the present disclosure, the present disclosure further provides an electronic device, a readable storage medium and a computer program product.

Figure 4:
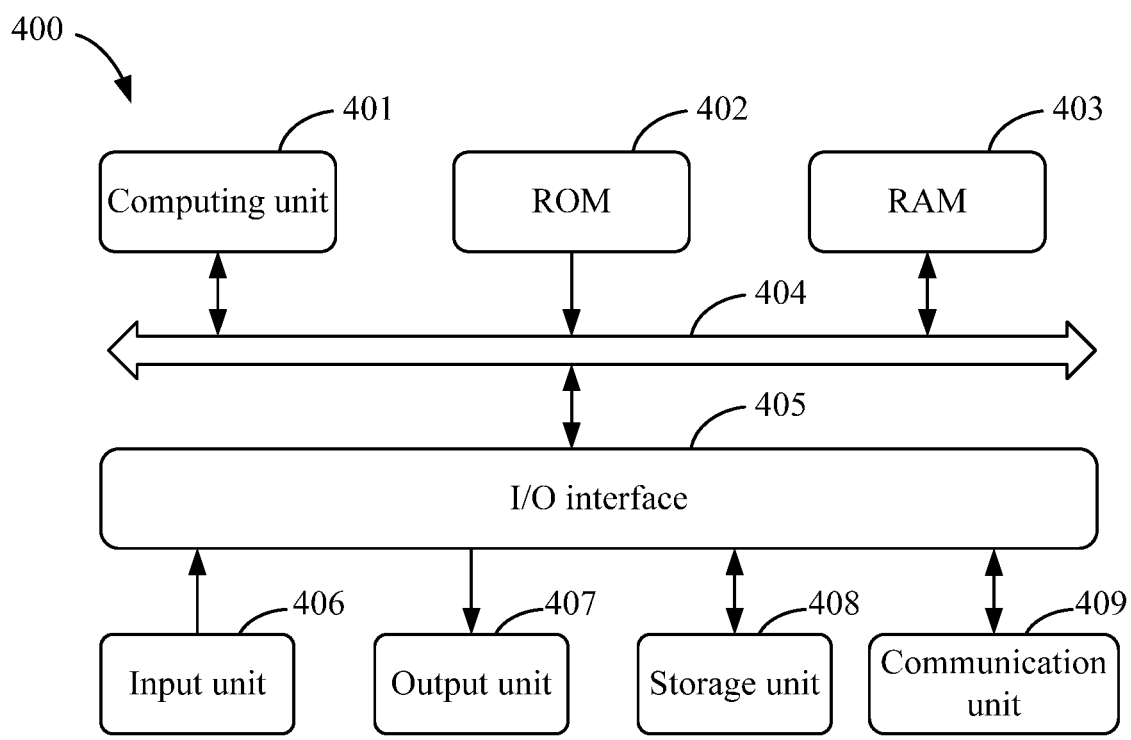
FIG. 4 is a block diagram of an electronic device for implementing a data processing method according to an embodiment of the present disclosure.

FIG. 4 is a block diagram of an exemplary electronic device 400 that may be configured to implement embodiments of the present disclosure. Electronic devices are intended to represent various forms of digital computers, for example, laptop computers, desktop computers, worktables, personal digital assistants, servers, blade servers, mainframe computers and other applicable computers. Electronic devices may further represent various forms of mobile apparatuses, for example, personal digital assistants, cellphones, smartphones, wearable devices and other similar computing apparatuses. Herein the shown components, the connections and relationships between these components, and the functions of these components are illustrative only and are not intended to limit the implementation of the present disclosure as described and/or claimed herein.

As shown in FIG. 4, the device 400 includes a computing unit 401. The computing unit 401 may perform various types of appropriate operations and processing based on a computer program stored in a read-only memory (ROM) 402 or a computer program loaded from a storage unit 408 to a random-access memory (RAM) 403. Various programs and data required for operations of the device 400 may also be stored in the RAM 403. The computing unit 401, the ROM 402 and the RAM 403 are connected to each other through a bus 404. An input/output (I/O) interface 405 is also connected to the bus 404.

A plurality of components in the device 400 are connected to the I/O interface 405. The components include an input unit 406 such as a keyboard and a mouse, an output unit 407 such as various types of displays and speakers, the storage unit 408 such as a magnetic disk and an optical disk, and a communication unit 409 such as a network card, a modem and a wireless communication transceiver. The communication unit 409 allows the device 400 to exchange information/data with other devices over a computer network such as the Internet and/or various telecommunications networks.

The computing unit 401 may be various general-purpose and/or dedicated processing components having processing and computing capabilities. Some examples of the computing unit 401 include, but are not limited to, central processing units (CPUs), graphics processing units (GPUs), various dedicated artificial intelligence (AI) computing chips, various computing units running machine learning models and algorithms, digital signal processors (DSPs), and any suitable processors, controllers and microcontrollers. The computing unit 401 performs various methods and processing described above, such as the data processing method. For example, in some embodiments, the data processing method may be implemented as a computer software program tangibly contained in a machine-readable medium such as the storage unit 408. In some embodiments, part or all of the computer program may be loaded and/or installed on the device 400 via the ROM 402 and/or the communication unit 409. When the computer program is loaded to the RAM 403 and executed by the computing unit 401, one or more steps of the preceding data processing method may be executed. Alternatively, in other embodiments, the computing unit 401 may be configured, in any other suitable manner (for example, by means of firmware), to perform the data processing method.

Herein various embodiments of the systems and technologies described above may be implemented in digital electronic circuitry, integrated circuitry, field-programmable gate arrays (FPGAs), application-specific integrated circuits (ASICs), application-specific standard products (ASSPs), systems on chips (SOCs), complex programmable logic devices (CPLDs), computer hardware, firmware, software and/or combinations thereof. The various embodiments may include implementations in one or more computer programs. The one or more computer programs are executable and/or interpretable on a programmable system including at least one programmable processor. The programmable processor may be a dedicated or general-purpose programmable processor for receiving data and instructions from a memory system, at least one input apparatus and at least one output apparatus and transmitting the data and instructions to the memory system, the at least one input apparatus and the at least one output apparatus.

Program codes for implementing the methods of the present disclosure may be compiled in any combination of one or more programming languages. The program codes may be provided for the processor or controller of a general-purpose computer, a special-purpose computer or another programmable data processing apparatus to enable functions/operations specified in a flowchart and/or a block diagrams to be implemented when the program codes are executed by the processor or controller. The program codes may be executed in whole on a machine, executed in part on a machine, executed, as a stand-alone software package, in part on a machine and in part on a remote machine, or executed in whole on a remote machine or a server.

In the context of the present disclosure, the machine-readable medium may be a tangible medium that may include or store a program that is used by or in conjunction with a system, apparatus or device that executes instructions. The machine-readable medium may be a machine-readable signal medium or a machine-readable storage medium. The machine-readable medium may include, but is not limited to, an electronic, magnetic, optical, electromagnetic, infrared or semiconductor system, apparatus or device or any suitable combination thereof. More specific examples of the machine-readable storage medium may include an electrical connection based on one or more wires, a portable computer disk, a hard disk, a random-access memory (RAM), a read-only memory (ROM), an erasable programmable read-only memory (EPROM), a flash memory, an optical fiber, a portable compact disk read-only memory (CD-ROM), an optical memory device, a magnetic memory device or any suitable combination thereof.

In order that interaction with a user is provided, the systems and techniques described herein may be implemented on a computer. The computer has a display device (for example, a cathode-ray tube (CRT) or a liquid-crystal display (LCD) monitor) for displaying information to the user and a keyboard and a pointing device (for example, a mouse or a trackball) through which the user can provide input to the computer. Other types of apparatuses may also be used for providing interaction with a user. For example, feedback provided for the user may be sensory feedback in any form (for example, visual feedback, auditory feedback or haptic feedback). Moreover, input from the user may be received in any form (including acoustic input, voice input or haptic input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with implementations of the systems and techniques described herein) or a computing system including any combination of such back-end, middleware or front-end components. Components of a system may be interconnected by any form or medium of digital data communication (for example, a communication network). Examples of the communication network include a local area network (LAN), a wide area network (WAN), a blockchain network and the Internet.

The computing system may include clients and servers. The clients and servers are usually far away from each other and generally interact through the communication network. The relationship between the client and the server arises by virtue of computer programs running on respective computers and having a client-server relationship to each other. The server may be a cloud server, also referred to as a cloud computing server or a cloud host, which is a host product in a cloud computing service system, so as to solve the defects of difficult management and weak traffic scalability in traditional physical hosts and VPS services.

It is to be understood that various forms of the preceding flows may be used, with steps reordered, added or removed. For example, the steps described in the present disclosure may be executed in parallel, in sequence or in a different order as long as the desired result of the technical solution disclosed in the present disclosure is achieved. The execution sequence of these steps is not limited herein.

The scope of the present disclosure is not limited to the preceding embodiments. It is to be understood by those skilled in the art that various modifications, combinations, subcombinations and substitutions may be made depending on design requirements and other factors. Any modifications, equivalent substitutions, improvements and the like made within the spirit and principle of the present disclosure are within the scope of the present disclosure.

What is claimed is:

1. A method for processing data of a target driving device, comprising:
   in a case where an operation state of an audio/video device in the target driving device is an out of operation state, generating, by a vehicle system in the target driving device, an out of operation state notification message of the audio/video device; and
   sending the out of operation state notification message to a push client in the target driving device for stopping a data push between the push client and a push server using the out of operation state notification message;
   wherein the operation state of the audio/video device is determined in the following manner:
   in a case where a state of a power supply switch of the target driving device is changed to an off state, acquiring an operating parameter of the target driving device;
   in a case where the operating parameter of the target driving device satisfies an out of operation condition of the audio/video device, determining that the operation state of the audio/video device in the target driving device is the out of operation state; and
   wherein the state of the power supply switch comprises an on state and an off state, in a case where the power supply switch is in the on state, the target driving device supplies power to the audio/video device; and in a case where the power supply switch is in the off state, the target driving device stops supplying power to the audio/video device.

2. The method according to claim 1, wherein the out of operation condition of the audio/video device comprises at least one of the following:
   a duration of the off state of the power supply switch of the target driving device exceeds a time threshold;
   a current value of the target driving device is less than a current threshold;
   a voltage value of the target driving device is less than a voltage threshold; or
   an open/closed state of a door of the target driving device is an open state.

3. The method according to claim 1, wherein sending the out of operation state notification message to the push client comprises:
   acquiring a registration request associated with the out of operation state notification message;
   extracting information about a message receiver from the registration request; and
   controlling, according to the information about the message receiver, the message receiver to forward the out of operation state notification message to the push client.

4. An apparatus for processing data of a target driving device, comprising at least one processor and a memory communicatively connected to the at least one processor; wherein the memory stores an instruction executable by the at least one processor, and the instruction is executed by the at least one processor to cause the at least one processor to perform steps in following modules:
   a notification message generation module, which is configured in a vehicle system in the target driving device and to generate an out of operation state notification message of an audio/video device in the target driving device in a case where an operation state of the audio/video device is an out of operation state; and
   a data push stopping module, which is configured in the vehicle system and to send the out of operation state notification message to a push client in the target driving device for stopping a data push between the push client and a push server using the out of operation state notification message;
   wherein the apparatus further comprises an operation state determination module which is configured to in a case where a state of a power supply switch of the target driving device is changed to an off state, acquire an operating parameter of the target driving device, and in a case where the operating parameter of the target driving device satisfies an out of operation condition of the audio/video device, determine that the operation state of the audio/video device in the target driving device is the out of operation state;

wherein the state of the power supply switch comprises an on state and an off state, in a case where the power supply switch is in the on state, the target driving device supplies power to the audio/video device; and in a case where the power supply switch is in the off state, the target driving device stops supplying power to the audio/video device.

5. The apparatus according to claim 4, wherein the out of operation condition of the audio/video device comprises at least one of the following:
   a duration of the off state of the power supply switch of the target driving device exceeds a time threshold;
   a current value of the target driving device is less than a current threshold;
   a voltage value of the target driving device is less than a voltage threshold; and
   an open/closed state of a door of the target driving device is an open state.

6. The apparatus according to claim 4, wherein the data push stopping module is configured to:
   acquire a registration request associated with the out of operation state notification message;
   extract information about a message receiver from the registration request; and
   control, according to the information about the message receiver, the message receiver to forward the out of operation state notification message to the push client.

7. A non-transitory computer-readable storage medium storing a computer instruction for causing a vehicle system of a target driving device to:
   in a case where an operation state of an audio/video device in the target driving device is an out of operation state, generate an out of operation state notification message of the audio/video device; and
   send the out of operation state notification message to a push client in the target driving device for stopping a data push between the push client and a push server using the out of operation state notification message;
   wherein the vehicle system of a target driving device determines the operation state of the audio/video device in the following manner:
   in a case where a state of a power supply switch of the target driving device is changed to an off state, acquiring an operating parameter of the target driving device;
   in a case where the operating parameter of the target driving device satisfies an out of operation condition of the audio/video device, determining that the operation state of the audio/video device in the target driving device is the out of operation state; and
   wherein the state of the power supply switch comprises an on state and an off state, in a case where the power supply switch is in the on state, the target driving device supplies power to the audio/video device; and in a case where the power supply switch is in the off state, the target driving device stops supplying power to the audio/video device.

8. The non-transitory computer-readable storage medium according to claim 7, wherein the out of operation condition of the audio/video device comprises at least one of the following:
   a duration of the off state of the power supply switch of the target driving device exceeds a time threshold;
   a current value of the target driving device is less than a current threshold;
   a voltage value of the target driving device is less than a voltage threshold; or
   an open/closed state of a door of the target driving device is an open state.

9. The non-transitory computer-readable storage medium according to claim 7, wherein the vehicle system of a target driving device sends the out of operation state notification message to the push client by:
   acquiring a registration request associated with the out of operation state notification message;
   extracting information about a message receiver from the registration request; and
   controlling, according to the information about the message receiver, the message receiver to forward the out of operation state notification message to the push client.

* * * * *